C. BERTHELOT.
OVEN WITH REGENERATORS.
APPLICATION FILED AUG. 15, 1919.
1,340,104.
Patented May 11, 1920.
3 SHEETS—SHEET 1.
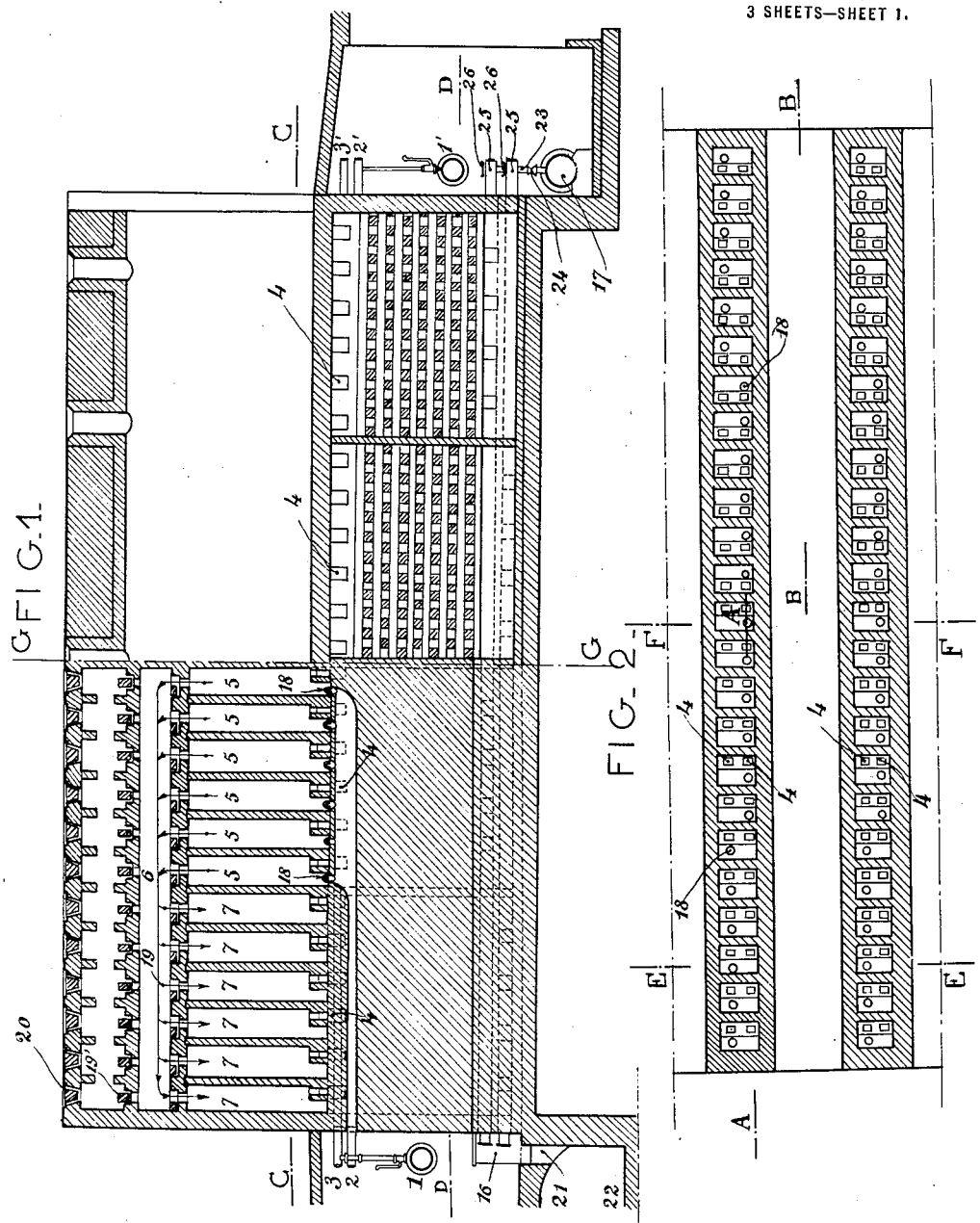
Inventor
Charles Berthelot
By H. B. Wilson & Co.
Attorneys

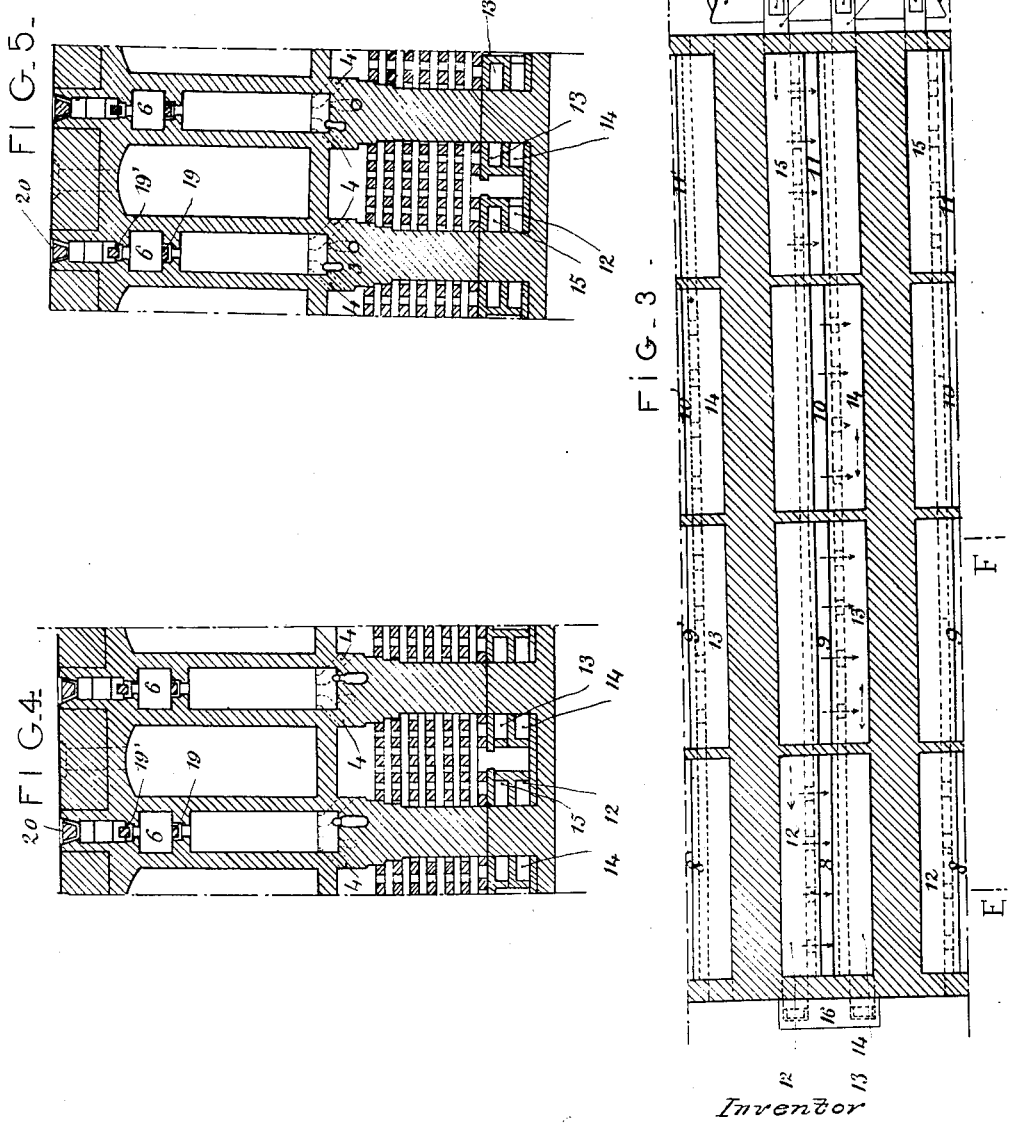

C. BERTHELOT.
OVEN WITH REGENERATORS.
APPLICATION FILED AUG. 15, 1919.
1,340,104.
Patented May 11, 1920.
3 SHEETS—SHEET 3.
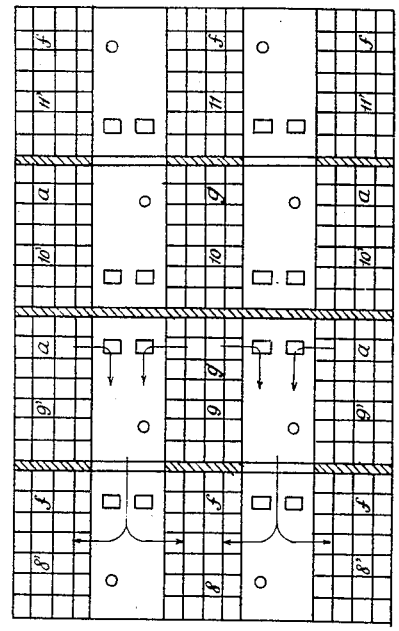
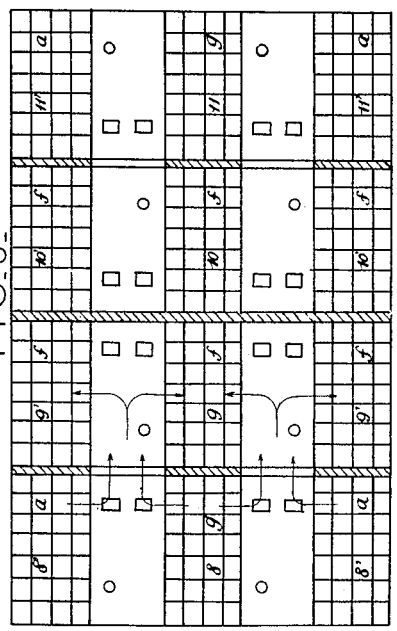
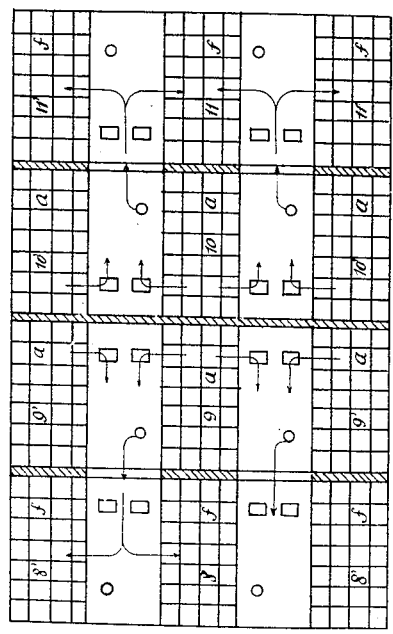
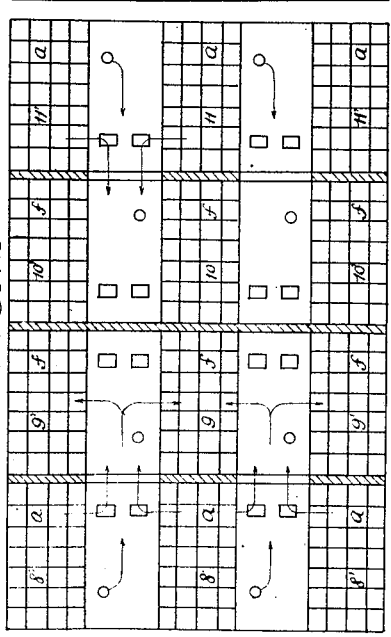
Inventor
Charles Berthelot
By H. B. Willson & Co.
Attorneys

UNITED STATES PATENT OFFICE.

CHARLES BERTHELOT, OF PARIS, FRANCE.

OVEN WITH REGENERATORS.

1,340,104.  Specification of Letters Patent.  Patented May 11, 1920.

Application filed August 15, 1919. Serial No. 317,780.

*To all whom it may concern:*

Be it known that I, CHARLES BERTHELOT, a citizen of the Republic of France, and residing at Paris, (Seine Department,) No. 94 Rue Saint Lazare, in the Republic of France, engineer, have invented certain new and useful Improvements in Ovens with Regenerators, (Cas. B,) of which the following is a specification.

Reference is made to my co-pending application No. 317,779, filed August 15, 1919.

The present invention relates to a furnace having vertical flues and, heat regenerators, and suitable principally for the manufacture of metallurgic coke or domestic coke and of lighting gas. Its form of construction is such that its heating may be effected by means of a gas of any caloric power.

One can also carbonize coal or any other substance.

This furnace which can be referred to as a furnace with longitudinal regenerators in parallel is arranged so as to be able to be heated either with a gas of high caloric power or rich gas (3.400 calories or more) or with a gas of low calorific power or poor gas (of 750 to 3.400 calories) this gas being in the latter case previously heated by its passage through regenerators.

The general arrangement of the furnace may be analogous to that of the furnace with longitudinal and parallel regenerators forming the object of the French patent of 16th July, 1918, for "Furnace with regeneration of heat" furnace, which comprises below each distillation chamber a longitudinal regenerator divided by vertical partitions into several distinct compartments with which communicate on the one hand combustion chambers formed in the masonry separating the distillation chambers, and on the other hand channels for the introduction of the combustion air and for the outlet of the smoke.

According to the present invention, each of the combustion chambers communicates with the two generators placed under the distillation chambers which are adjacent to it, on the other hand conduits connected to a source of rich gas are arranged below combustion chambers and allow of conducting this gas alternatively to different points in these chambers, and other conduits connected to a source of poor gas are arranged below a half of the number of regenerators which permits also of conducting, alternatively to different points in the combustion chambers the poor gas previously heated by its passage through the regenerators which is advantageous for economic use of this fuel.

Suitable obturators, vanes, registers, etc., allow of regulating the passage of the gases of the air and of the vapors so that the direction of circulation can be periodically reversed in the combustion chambers and in the generators, both when the rich gas as well as when the poor gas, is used. In the first case each combustion chamber receives hot air from two adjacent regenerators: in the second case, it receives the hot air from one of these regenerators and poor gas from the other adjacent regenerator.

A form of construction of a furnace according to this invention is represented in the annexed drawing by way of example.

Figure 1 shows a longitudinal section of a furnace with flues and regenerators, the left part being shown along the line A—A¹ and the right part along the line B—B of Fig. 2.

Figs. 2 and 3 are horizontal sections, the first on the line C—C of Fig. 1 at the level of the air and gas admission conduits in the pier, the second on the line D—D at the base of the regenerators.

Figs. 4 and 5 are two vertical sections, the first on the line E—E of Figs. 2 and 3 and the second on the line F—F.

Figs. 6 and 7 are diagrammatic views relating to the working of the furnace with rich gas.

Figs. 8 and 9 illustrate the working with heating by poor gas.

In these diagrammatic views $a$, $g$ and $f$ indicate the compartments of the regenerators traversed by the air, the poor gas, and the vapors respectively.

The circulation of the gases in this furnace is as follows:—

*Heating by rich gas.*—The gas is introduced in a permanent manner by the channels 1 and 1¹. During the first period, generally half an hour, it is distributed in the heating chambers by the cocks 2 and 2¹, during the second period by the cocks 3 and 3¹.

A row of conduits distributes the gas to a series of calibrated orifices or twyers 18 leading into the vertical chambers 5 of the pier.

During the first period in the left half of the pier it is considered that the hot air coming from the contiguous compartments 9 and $9^1$ enters through the particular orifices 4 and determines the combustion of the gases.

The twyers 18 are accessible from the upper part of the furnace by means of removable plugs 20 and $19^1$ so as to facilitate the uniform regulation of the admission of the gas along the wall of the furnace. This regulation is further possible by the displacement of the registers 19.

The incandescent gases rise in the chambers 5, traverse the horizontal channel 6, then descend in the flues 7 and pass to the compartments contiguous to the refrigerators 8 and $8^1$.

The flow of the gases in the right half of the pier is symmetrical to that of the left with respect to the axis G—G.

During the second period the direction of the gases is reversed: these rise along the flues 7, descend along the channels 5 and pass to the compartments of the regenerators 9 and $9^1$ for the left half of the furnace and 10 and $10^1$ for the right half.

In one furnace among the four distinct compartments forming the whole of a given regenerator two compartments symmetrical with respect to the vertical axis G—G of the furnace are traversed simultaneously during a given period by the combustion air to be reheated, and during the following period by the gases, the sensible heat of which is to be recuperated.

For example, during the first period the compartments 9—$9^1$ and 10—$10^1$ are traversed by the air for combustion while the compartments 8—$8^1$ and 11—$11^1$ are traversed by the gases.

Inversely, during the second period the compartments 9—$9^1$ and 10—$10^1$ receive the gases while the compartments 8—$8^1$ and 11—$11^1$ receive the air for combustion.

To each of the compartments of the regenerator corresponds a respective channel 12—13—14—15 situated at its base: at one of the extremities these four channels end in four air registers and at the other extremity they end in a cast iron head with a register. It is by means of these registers that the admission of air and the evacuation of the gases can be regulated in each compartment of the regenerator, that is to say, of the pier itself. The whole of the gases is conducted by means of this head and the pipe 21 into the collector channel 22 leading to the chimney.

*Heating with poor gas.*—With respect to the preceding case the working of this furnace has a principal difference as follows:

The regenerator of a given parity for example I, III, V, (Fig. 8) have their respective compartments traversed in a distinct manner by the poor gas and the vapors and those of the other parity being II, IV, VI, by the combustion of air and the vapors. There cannot consequently be produced in any of the compartments of the regenerators an explosive mixture of air and gas.

There is only one channel 17 instead of two, as in the previous construction for the arrival of the heating gas.

Finally, while the rich gas is admitted at the base of the pier, the poor gas is introduced at the foot of the regenerators.

In the same furnace among the four distinct compartments forming the whole of a given regenerator two compartments symmetrical with the vertical axis G—G of the furnace (Fig. 1) are traversed simultaneously during a determined period by the combustion air or the poor gas to be reheated according to the parity of the furnace to which they belong and the two other compartments by the vapors at the following period, the preceding compartments traversed by the poor gas or the combustion air receiving the vapors and those across which the vapors flow receiving at this moment the poor gas or the combustion air according to the parity of the furnace.

The description which follows of the circulation of the gases in this furnace describes also this method of working.

During the first period the poor gas is conducted to the compartments 9 and 10 by means of the general arrangement of pipe distributers 23 (provided with stop cock 24). The combustion air penetrates into the compartments $9^1$ and $10^1$ by means of pipings 25 (provided with registers 26).

After having passed from below upward through the compartments of the respective regenerators, the poor gas and the combustion air at high temperature rise as they issue from the orifices 4. The incandescent gases then traverse the flues 5, 6, 7 successively and are then distributed between the compartments of the regenerators 8—$8^1$ and 11—$11^1$, the ascents 12 and 15 to finally pass to the chimney by the flue collector 21.

During the second period the combustion air circulates in the compartments $8^1$ and $11^1$, the poor gas in the compartments 8 and 11. The mixing and the ignition of these two fluids takes place at the base of the vertical flues 7. The incandescent gases then successively traverse the flues 7—6—5, then divide themselves between the compartments 9—$9^1$ and 10 and $10^1$ to arrive at 13 and 14.

Each compartment of the regenerator could be divided longitudinally into two distinct parts by a partition so as to facilitate the equal division of the fluids going to the piers or coming therefrom.

This addition does not modify at all the direction of the circulation of the fluids nor the method of working which has been described.

It is necessary to mention that the pier is divided longitudinally into four equal parts, of which the end parts are simultaneously traversed by parallel incandescent currents of the same direction but distinct. It is thus possible to render the duration of heating direct, or in other words of heating by means of rising gaseous currents for a longer period than the duration of heating of these same end parts by descending currents of combustion gas. One thus making good the losses of heat by radiation which is invariably produced through the doors of furnaces. The duration of direct heating of the two median parts is thus reduced but this does not cause any inconvenience since these are in the midst of the masonry work of the furnace.

In the form of construction described the regenerators are divided longitudinally into four compartments and each pier comprises four combustion chambers.

It is to be mentioned that the number four can be replaced by any other equal number without the characteristics of the invention being changed.

Claims:

1. A furnace comprising carbonizing chambers, vertical flues, heat regenerators placed below said chambers and divided into compartments, longitudinal flues arranged above said vertical flues, channels connecting each of said regenerators to the lower part of adjacent flues, channels connecting the upper part of the vertical flues to the longitudinal flues situated below them, means adapted to place in communication half of the vertical flues placed between two carbonizing chambers simultaneously with the two adjacent regenerators and with the longitudinal flue situated above said vertical channels, means adapted to make the said longitudinal flue communicate with the other half of said vertical flue and the latter with the adjacent regenerators.

2. A furnace comprising carbonizing chambers, vertical flues, heat regenerators placed below said chambers and divided into compartments, longitudinal flues arranged above said vertical flues, channels connecting each of said regenerators to the lower part of adjacent flues, channels connecting the upper part of the vertical flues to the longitudinal flues situated below them, means adapted to cause the air to circulate in a half of the compartments of the regenerators for sending this air then into a half of the vertical flues, for sending at the same time into the latter rich gas, for causing the vapors to circulate in the other half of the compartments of the regenerators and to reverse after each period the direction of the air, the gases, and the vapors.

3. A furnace comprising carbonizing chambers, vertical flues, heat regenerators placed below said chambers and divided into compartments, longitudinal flues arranged above said vertical flues, channels connecting each of said regenerators to the lower part of adjacent flues, channels connecting the upper part of the vertical flues to the longitudinal flues situated below them, means adapted to cause the air to circulate in a half of the compartments of the regenerators situated on one side of the vertical flues, poor gas in a half of those situated on the other side, to cause this air and this poor gas to arrive in a half of the vertical flues and to then make the vapors circulate in the other halves of the said compartments.

In testimony that I claim the foregoing as my invention I have signed my name in the presence of two subscribing witnesses.

CHARLES BERTHELOT.

Witnesses:
  CHAS. P. PRESSLY,
  MAURICE ROUY.